Sept. 20, 1927.

F. W. GUNN 1,643,160

HOSE CLAMP APPLIER

Filed Oct. 12, 1925

INVENTOR
F. W. Gunn
BY
ATTORNEYS

Patented Sept. 20, 1927.

1,643,160

UNITED STATES PATENT OFFICE.

FRED WILLIS GUNN, OF BOSTON, MASSACHUSETTS.

HOSE-CLAMP APPLIER.

Application filed October 12, 1925. Serial No. 62,170.

My invention is a tool for applying a hose clamp and it consists in the combinations, constructions and arrangements herein described and claimed.

An object of the invention is the provision of a tool which is simple in construction and can be conveniently and easily manipulated to secure a clamp in place on a hose or like object.

Other objects and advantages of the invention will be apparent from the following description, considered in conjunction with the accompanying drawings, in which:—

Figure 1:
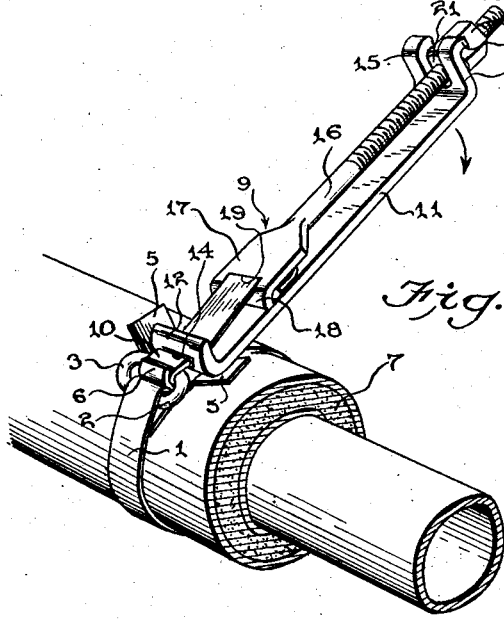
Figure 4:
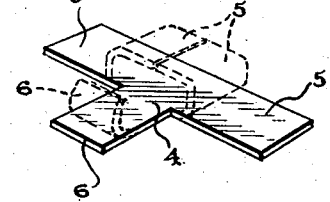
Figure 2:
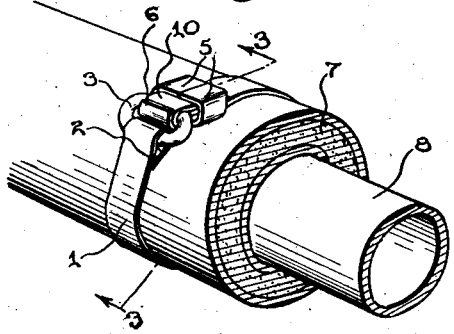
Figure 3:
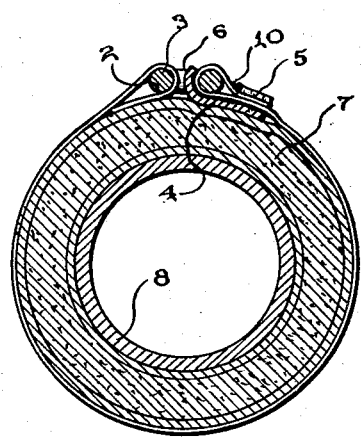

Figure 1 is a perspective view showing the clamp applier engaged with a clamp, and the latter partially secured in place on a hose, Figure 2 is a perspective view of the hose exhibited in Figure 1 with the clamp fully secured thereon, Figure 3 is a relatively enlarged section along the line 3—3 of Figure 2, and Figure 4 is a perspective view of a combined spacing and securing clip which is comprised in the clamp, showing in full lines the clip in developed form and showing in dotted lines the clip as it appears when it has been applied.

A clamp with which the improved tool may be used comprises a strap-like body 1 which is made of a suitable light gauge metal that can be bent under stress but which possesses sufficient strength and rigidity to maintain its form until a considerable bending stress has been applied thereto. One end portion of the body 1 of the clamp is bent backwardly onto the body to provide a transverse eye 2 which is engaged with endless link 3.

A clip which is comprised in the clamp is formed of a substantially T-shaped piece of light gauge metal and comprises a substantially flat body portion 4 having a pair of flat oppositely extending relatively long lateral wing portions 5 at one end thereof. This clip preferably is made of the same metal as the body 1 of the clamp. The free end portion of the body 4 of the clip is bent to curve upwardly and rearwardly substantially along the arc of a circle as indicated by the dotted lines at 6 in Figure 4 and by full lines in the remaining views of the drawings. The width of the body 4 of the clip from its line of juncture with the wings 5 to the free end of the body of the clip preferably is the same as the width of the body 1 of the clamp.

In Figures 1 to 3 inclusive, the numeral 7 designates a hose which is made of rubber composition or other suitable compressible material. The hose 7 fits on a metal pipe 8 to which it is to be clamped by means of the improved clamp.

In use, the body 1 of the clamp is bent around the hose 7 until the free end portion of the body 1 of the clamp is close to the endless link 3. The clip then is slipped under the free end portion of the body 1 of the clamp with the upturned end portion 6 of the body of the clip extending into the eye of the link 3 and with the wings 5 of the clip extending laterally at opposite sides of the free end portion of the body 1 of the clamp. The free end portion of the clamp then is threaded through the link 3 between the adjacent portions of the latter and the upturned end portions 6 of the body of the clip and is engaged with the improved clamp applying tool generally indicated at 9. The tool 9 is constructed in a manner which will be presently described and is manipulated as also will be hereinafter set forth to draw the free end portion of the body 1 of the clamp through the link 3 until the body of the clamp exerts a desirable binding action on the hose 7. The free end portion of the body of the clamp then is bent rearwardly and downwardly as indicated at 10 on to the adjacent portions of the body 1 of the clamp and is secured in place by the wing portions 5 of the clip which are bent over the side edges of the adjacent portions of the body 1 of the clamp and the side edges of the return end portion 10 of the body of the clamp downwardly and inwardly after the return portion 10 of the body of the clamp to the position shown in Figure 2, thus firmly holding the end portion 10 of the body of the clamp in place. In addition to having the functions just mentioned, the clip also serves to prevent the hose body from bulging outwardly into the eye of the link 3 when the body of the clamp is tightened on the hose, since the end portions 6 and the portions of the body 1 of the clamp which extend through the eye of the link practically close the latter and the body 4 of the clip serves to slightly space the hose body from the space within the link 3.

The tool 9 comprises an elongated substantially flat body 11 having upturned end portions 12 and 13 respectively. The upturned end portion 12 is formed adjacent its juncture with the remainder of the body 11 with a transverse slot 14 through which the free end portion of the body 1 of the clamp may extend. The upturned end portion 15 is of greater length than the end portion 12 and has the extremity thereof turned outward as indicated at 13ª. The upturned end portion 13 is bifurcated from its upper end nearly to its juncture with the remainder of the body 11 by a vertical slot 15. A member for co-operating with the body 11 of the tool to engage with the free end portion of the clamp body 1 and to tighten the clamp body and bend the free end portions thereof as desired, comprises a rod 16 having a flattened head portion 17 turned downwardly at its extremity to provide a bearing portion 18. The head portion 17 of the clamp tightening member is formed with a transverse slot 19 which is located adjacent to the juncture of the downturned end portion 18 with the remainder of the flattened head portion of the clamp tightening member. The slot 19 is of sufficient area to permit the free end portion of the body 1 of the clamp to be extended therethrough. The width of the slot 15 in the upturned end portion 13 of the body of the tool is slightly greater than the diameter of the outer end portion of the rod 16 of the clamp tightening member.

After the free end portion of the body 1 of the clamp has been projected through the eye of the link 3 and has been turned slightly outward and downward, the body 11 of the tool is positioned with the free end portion of the body 1 of the clamp extending through the slot 14 along the upper side of the body 11 and with the upturned end portion 12 of the body of the tool against the body of the clip and the adjacent portion of the link 3, or close to the latter. The clamp body tightening member 16 then is manipulated on the body 11 of the tool until the free end portion of the body 1 of the clamp extends through the slot 19 this being readily accomplished when the outer end of the clamp body tightening member has been swung upwardly until the clamp body tightening member rests at the edge of the portion 18 of the head of the tightening member on the body 11 of the tool and the clamp body tightening member is substantially perpendicular to the tool body 11, in other words substantially at right angles to the position shown in Figure 1. At this time the slot 19 will be horizontal. After the clamp body tightening member has been disposed on the body 11 with the free end portion of the body 1 of the clamp extended through the slot 19, the outer end portion of the clamp body tightening member is swung downwardly to position to rest in the slot 15, as shown in Figure 1. This swinging movement of the clamp body tightening member and the body 11 of the tool as a fulcrum will cause the free end portion of the body 1 of the clamp to bend downwardly where the body of the clamp extends through the slot 19. The free end portion of the shank of the body tightening member is screw threaded for engagement with a nut 20. A washer 21 preferably is placed on the shank of the clamp body tightening member between the nut 20 and the upturned end portion 13 of the body of the tool. When the nut 20 has been tightened, this washer will engage with the outwardly turned portion 13ª of the body of the tool and the clamp body tightening member thus will be prevented against swinging accidentally upward in the slot 15 from the position shown in Figure 1. The nut 20 can be tightened to draw the clamp body tightening member outwardly on the body of the tool until the body of the clamp has been tightened on the hose as desired. The complete tool then is swung downwardly as a unit until the free end portions of the body of the clamp have been bent close to the binding portion of the body of the clamp. Any excess material is then severed from the free end portion of the body of the clamp and the tool is disengaged from said free end portion of the body of the clamp which then is bent downward slightly to produce the hereinbefore mentioned return bent portion 10. As previously stated, the return bent portion 10 of the body of the clamp is secured in place by the bent over wings 5 of the clips 4—5 as well as by reason of the strength of the material of which the body of the clamp is formed.

Obviously, the invention is susceptible of embodiments in forms other than that which is illustrated in the accompanying drawings, and I therefore consider as my own all such modifications and adaptations thereof as fairly fall within the scope of the appended claim.

I claim:—

A tool for applying a hose clamp, said tool comprising an elongated body having upturned end portions, one of said end portions having a transverse slot therein adjacent to the juncture of said end portion with the remainder of the body of the tool, the other of said end portions having a vertical slot formed therein extending from the upper end of said upturned end portion nearly to the juncture of the latter with the remainder of the body of the tool, and a clamp tightening member comprising a rod-like shank portion provided with screw threads and extending through the slot of the vertically slotted upturned end portion of the body, the opposite end portion of said shank being enlarged laterally to provide a head, said head of the clamp tightening member having a downturned edge portion resting slidably on the body of the tool, said head of the clamp tightening member having a transverse slot therein adjacent to the juncture of the downturned part thereof with the remainder of the head portion of the body, and means adjustably engageable with the threaded shank of the clamp tightening member and in contact with the outer face of the vertically slotted upturned end portion of the body for adjusting the clamp tightening member longitudinally of the body in one direction, the upper edge portion of the vertically slotted upturned end portion of the body of the tool being turned outward to produce a stop for engagement with the adjustable means on the threaded shank of the clamp tightening member to prevent its displacement from the slot of the vertically slotted upturned end portion of the body.

FRED WILLIS GUNN.